(12) United States Patent
Menini et al.

(10) Patent No.: US 7,833,935 B2
(45) Date of Patent: Nov. 16, 2010

(54) IRON OXIDE CONTAINING PRECIPITATED CRYSTALLINE TITANIUM DIOXIDE AND PROCESS FOR THE MANUFACTURE THEREOF

(75) Inventors: Claudia Menini, Turin (IT); Marino Sergi, Turin (IT)

(73) Assignee: Rockwood Italia S.p.A. (IT)

( * ) Notice: Subject to any disclaimer, the term of this patent is extended or adjusted under 35 U.S.C. 154(b) by 0 days.

(21) Appl. No.: 11/913,743

(22) PCT Filed: Aug. 11, 2006

(86) PCT No.: PCT/EP2006/068245
§ 371 (c)(1),
(2), (4) Date: Dec. 3, 2007

(87) PCT Pub. No.: WO2008/055542
PCT Pub. Date: May 15, 2008

(65) Prior Publication Data
US 2009/0318285 A1    Dec. 24, 2009

(51) Int. Cl.
*B01J 23/70*    (2006.01)
(52) U.S. Cl. .................. 502/338; 977/811; 106/712
(58) Field of Classification Search .................. 502/338
See application file for complete search history.

(56) References Cited

U.S. PATENT DOCUMENTS

| | | | | |
|---|---|---|---|---|
| 2,732,310 | A | * | 1/1956 | Miller et al. ................. 106/437 |
| 4,175,110 | A | * | 11/1979 | Tolley ........................... 423/83 |
| 4,277,288 | A | | 7/1981 | Lawrence |
| 4,946,505 | A | | 8/1990 | Jungk |
| 5,837,050 | A | | 11/1998 | Okuda et al. |
| 6,136,186 | A | | 10/2000 | Gonzalez-Martin |
| 6,562,120 | B2 | | 5/2003 | Emery |
| 6,566,300 | B2 | | 5/2003 | Park et al. |
| 6,956,006 | B1 | * | 10/2005 | Mirsky et al. ............... 502/236 |
| 2001/0006933 | A1 | | 7/2001 | Nagasaki |

(Continued)

FOREIGN PATENT DOCUMENTS

AU    B5470590    11/1990

(Continued)

OTHER PUBLICATIONS

International Preliminary Report on Patentability for International Patent Application Serial No. PCT/EP2006/068245, mailed May 22, 2009.

(Continued)

*Primary Examiner*—Melvin C Mayes
*Assistant Examiner*—Bijay S Saha
(74) *Attorney, Agent, or Firm*—McAndrews, Held & Malloy, Ltd.

(57) ABSTRACT

The present invention is directed to a process for the manufacture of iron oxide particles coated with crystalline titanium dioxide, wherein the process comprises the steps of adding an aqueous solution of at least one titanyl salt to an iron oxide dispersion to form a reaction mixture, precipitating titanium dioxide on said iron oxide particles by adding an alkali, wherein the titanium dioxide is at least partially in a crystalline form, and isolating the resulting titanium dioxide-containing iron oxide particles from the reaction mixture. The invention is further related to iron oxide particles comprising precipitated crystalline titanium dioxide and the use of the resulting photocatalytically active material.

38 Claims, 6 Drawing Sheets

U.S. PATENT DOCUMENTS

| | | |
|---|---|---|
| 2002/0185040 A1 | 12/2002 | Egger |
| 2003/0037705 A1 | 2/2003 | Hartmann et al. |
| 2003/0066458 A1 | 4/2003 | Emery |
| 2004/0040469 A1 | 3/2004 | McAulay |
| 2004/0120884 A1 | 6/2004 | Sherman |
| 2004/0131852 A1* | 7/2004 | Shimo et al. ............ 428/402 |
| 2007/0181167 A1 | 8/2007 | Muradov |

FOREIGN PATENT DOCUMENTS

| | | |
|---|---|---|
| DE | 2940156 A1 | 10/1979 |
| DE | 3619363 A1 | 10/1987 |
| DE | 3918694 C1 | 10/1990 |
| DE | 102005052397 A1 | 5/2006 |
| EP | 0191278 A2 | 8/1986 |
| EP | 0 282 329 | 9/1988 |
| EP | 0282329 A1 | 9/1988 |
| EP | 0396975 A2 | 11/1990 |
| EP | 0567882 A1 | 11/1993 |
| EP | 0657511 A1 | 6/1995 |
| EP | 0666107 A2 | 8/1995 |
| EP | 1 413 607 | 4/2004 |
| EP | 1413607 A2 | 4/2004 |
| EP | 1620512 A1 | 11/2004 |
| EP | 1559753 A2 | 3/2005 |
| EP | 1 726 566 | 11/2006 |
| EP | 1726566 A2 | 11/2006 |
| GB | 2425075 A | 10/2006 |
| JP | 2001029797 | 2/2001 |
| JP | 2001179109 | 7/2001 |
| JP | 2002201059 | 7/2002 |
| JP | 2004130156 | 4/2004 |
| JP | 2004161978 | 6/2004 |
| JP | 2004277235 | 7/2004 |
| JP | 2004231927 | 8/2004 |
| WO | 0153228 | 7/2001 |
| WO | 0171121 A1 | 9/2001 |
| WO | 02038272 A1 | 5/2002 |
| WO | 2004052533 A1 | 6/2004 |
| WO | WO 2004/052533 | 6/2004 |
| WO | 2006000565 A1 | 1/2006 |
| WO | 2006008434 A2 | 1/2006 |
| WO | 2008055542 A1 | 5/2008 |

OTHER PUBLICATIONS

Gennari et al., "Kinetics of the anatase—rutile transformation in $TiO_2$ in the presence of $Fe_2O_3$", Journal of Materials Science, vol. 33, 1998, pp. 1571-1578.

Penpolcharoen et al., "Role and Fate of Hematite in Titania Coated Hematite Photocatalysts", J. Adv. Oxid. Technol., vol. 5, No. 1, 2002, pp. 93-106.

Sato et al., "Solvotherman synthesis of visible light responsive nitrogen-doped titania nanocrystals", J Mater Sci, vol. 41, 2006, pp. 1433-1438.

Yamabi et al., "Crystal Phase Control for Titanium Dioxide Films by Direct Deposition in Aqueous Solutions", Chem. Mater., vol. 14, No. 2, 2002, pp. 609-614.

Yin et al., Hydrothermal synthesis of nanosized anatase and rutile $TiO_2$ using amorphous phase $TiO_2$, J. Mater. Chem., 2001, vol. 11, pp. 1694-1703.

Yu et al., "Formation of nanoporous titanium oxide films on silicon substrates using an anodization process". Institute of Physics Publishing, Nanotechnology, vol. 17, 2006, pp. 808-814.

European Examination Report corresponding to European Patent Application No. 06 819 336.6-2111, dated Jul. 8, 2008, 5 pages.

Sato, Solvotherman Synthesis of Visible Light Responsive Nitrogen-Doped Titania Nanocrystals, A Novel Method of Advanced Materials Processing, J. Mater Sci 41, 2006, pp. 1433-1438.

Yamabi, Crystal Phase Control for Titanium Dioxide Films by Direct Deposition in Aqueous Solutions, Chem. Mater. vol. 14, No. 2, 2002, pp. 609-614.

Yin, Hydrothermal Synthesis of Nanosized Anatase and Rutile $TiO_2$ Using Amorphous Phase $TiO_2$, J. Mater Chem, 11, 2001, 1694-1703.

Yu, Formation of Nanoporous Titanium Oxide Films on Silicon Substrates Using An Anodization Process, Institute of Physics Publishing, Nanotechnology 17, 2006, pp. 808-814.

Gennari, Kinetics of the Anatase-Rutile Transformation in $TiO_2$ in the Presence of $Fe_2O_3$, Journal of Materials Science 33, 1998, pp. 1571-1578.

Penpolcharoen, Role and Fate of Hematite in Titania Coated Hematite Photocatalysts, J. Adv. Oxide Technol. vol. 5, No. 1, 2002, pp. 93-106.

European Patent Office, Communication with European Search Report in EP Application No. 10154720.6, dated Apr. 19, 2010.

Beydoun, D. et al., "Implications of Heat Treatment on the Properties of a Magnetic Iron Oxide-Titanium Dioxide Photocatalyst", Material Science and Engineering B, Elsevier Sequoia, Lausanne, CH LNKD-DOI:10.1016/S0921-5107(02)0085-5, vol. 94, No. 1, Jun. 15, 2002, pp. 71-81, XP004352878, ISSN 0921-5107.

* cited by examiner

IRON OXIDE CONTAINING PRECIPITATED CRYSTALLINE TITANIUM DIOXIDE AND PROCESS FOR THE MANUFACTURE THEREOF

The present invention is directed to a process for the manufacture of iron oxide particles coated with crystalline titanium dioxide, wherein the process comprises the steps of adding an aqueous solution of at least one titanyl salt to an iron oxide dispersion to form a reaction mixture, precipitating titanium dioxide on said iron oxide particles by adding an alkali, wherein the titanium dioxide is at least partially in a crystalline form, and isolating the resulting titanium dioxide-containing iron oxide particles from the reaction mixture. The invention is further related to iron oxide particles comprising precipitated crystalline titanium dioxide and the use of the resulting photocatalytically active material.

BACKGROUND OF THE INVENTION

Different technologies have been proposed in the past directed to the issue of coating titanium dioxide onto a support layer, for example pyrogenic techniques. For example, US 20030037705 discloses a titanium dioxide powder which contains iron oxide, which is obtained by flame hydrolysis of $FeCl_3$ and $TiCl_4$. However, this results in a mixture of the two oxides, and no indication of any crystalline phase is disclosed. JP 2004231927 teaches the deposition of $Ti_2O_3$ on silica sol particles by co-dispersing silica sol and dititanium trioxide particles obtained by firing a mixture of titanium hydride and titanium dioxide in an inert atmosphere.

Furthermore, electrochemical processes have been proposed for coating titanium dioxide onto support layers, for example in "Formation of nanoporous titanium oxide films on silicon substrates using an anodization process", Yu et al., Nanotechnology, 2006, 17, 808-814, a porous film of titanium dioxide is deposited on a silicon substrate by electrochemical processes.

Most of the publications deal with hydrolytic techniques. For example, US2004120884 teaches the coating of carrier particles such as organic polymers with a sol of titanium dioxide particles obtained after several process steps. No crystalline phase of the final coating is disclosed in this publication. Furthermore, U.S. Pat. No. 5,837,050 discloses a process to make a sol of iron containing rutile crystallite, where the final material is a solution of rutile particles coated with iron oxide. U.S. Pat. No. 6,566,300 teaches the preparation of a photocatalyst by impregnation of zeolite ZSM-5 with a solution of titanium tetraisopropoxide. Another coating process is described in JP 2004161978, where a pigment particle, like an inorganic substance, is coated with titanium dioxide, and the coated pigment is then calcined. No indication of a crystalline titanium dioxide phase is given. Yamabi et al., Chem. Mater., 2002, 14, 609-614 describe the precipitation of titanium dioxide from solution at a pH below 2 at room temperature and an anatase or rutile phase may be obtained, depending on the pH and titanium (IV) concentration. However, barium chloride need to be added as an ion exchanger and the solution must be left at 60° C. for several days. Penpolcharoen et al., J. Adv. Oxide. Technol., 2002, 5, 1 describe a sol/gel method to coat nano-hematite and colloidal hematite particles with titanium dioxide. In the final step of the process, the material is calcined at 873K. Both of the titanium dioxide phases are obtained, but no control of the relative proportions of the phases is achieved. EP 0 282 329 B1 discloses flaky micaceous iron oxide which is coated hydrothermally with rutile type titanium dioxide in the presence of salts of Zn, Sn, Sb, Li. The coating layer needs to be calcined at a temperature ranging from 500° C. to 1000° C. Yin et al., J. Mater. Chem. 2001, 11, 1694-1703 disclose an amorphous titanium dioxide suspension which by hydrothermal treatment under acidic condition leads to the formation of a mixture of anatase, brookite and rutile nanocrystallites. The process disclosed in this documents involves autoclaving at 150° C. for 21 h.

Gennari and Pasquevich, J. Material Sci., 1998, 22, 1571-1578 describe a process in which a physical mixture of anatase, rutile (95% anatase) and $\alpha$-$Fe_2O_3$ is heated at a temperature above 400° C. to study the kinetic of $TiO_2$ phase transformation. The presence of iron oxide enhances conversion of anatase to rutile because $Fe^{3+}$ ions that diffuse inside the $TiO_2$ crystals allow formation of oxygen vacancies. Sato et all, J. Material Sci., 2006, 41, 1433-1438 describe a homogeneous precipitation of N-doped $TiO_2$ from an organic solution of $TiCl_3$. The material needs calcinations to convert into crystalline nitrogen-doped $TiO_2$. The phase composition depends on precipitation solution pH and solvent changing from anatase to rutile or brookite.

When looking at the prior art, it is obvious that it is difficult to obtain titanium dioxide which is uniformly layered on a support. Many of the cited publications do not achieve a crystal phase at all, and some of those which disclose a process resulting in one or may be the other crystalline titanium dioxide phase cannot guarantee the proportions of the crystal phase composition. Thus, there is a need for a process by which the titanium dioxide crystal phase composition could be controlled by changing some of the operative conditions.

Another need is to deposit titanium dioxide with a nanocrystalline structure. Furthermore, many of the processes in the prior art turn out to be rather costly and elaborate, for example they include calcination or autoclaving steps. Thus, there is a further need for a process for deposition of titanium dioxide on a support which is simple and cost-efficient.

SUMMARY OF THE INVENTION

It is an object of the invention to provide a simple and cost-efficient process for producing iron oxide particles containing crystalline titanium dioxide A further object of the present invention is the provision of iron oxide particles comprising crystalline titanium dioxide for use as a photocatalytically active material.

The solution to the above objects is provided by the process and products described in the independent claims attached hereto. Preferred embodiments arise from a combination of the features of the dependent claims with those of the independent claims.

According to one aspect of the present invention, a process for the manufacture of iron oxide particles containing crystalline titanium dioxide is provided, comprising the steps of:
  a. adding an aqueous solution of at least one titanyl salt to an iron oxide dispersion to form a reaction mixture;
  b. precipitating titanium dioxide on said iron oxide particles by adding an alkali, wherein the titanium dioxide is precipitated at least partially in a crystalline form;
  c. isolating the resulting titanium dioxide-containing iron oxide particles from the reaction mixture.

According to a preferred aspect of the present invention, the precipitation of titanium dioxide is performed by simultaneous or sequential addition of at least one alkali to the reaction mixture. This may, for example, be done by adding the titanyl salt solution to the iron oxide particle dispersion simultaneously with the alkali, e.g., the titanyl salt solution and a separate alkali solution may be simultaneously added to the iron oxide particle dispersion. Alternatively, precipitation can be achieved by addition of a preformed mixture of the at least one titanyl salt and one alkali to the iron oxide particle dispersion.

When simultaneously adding the titanyl salt solution and the alkali to the iron oxide particle dispersion, the pH of the reaction mixture is preferably controlled so that the pH of the reaction mixture during addition of titanyl salt and/or alkali solution to the iron oxide particle dispersion is maintained to control the crystal phase mixture composition of the titanium dioxide. Control of pH may be achieved, for example, by controlling the feed of the titanyl salt and/or the alkali solution.

After complete addition of the titanyl salt solution and simultaneous addition of alkali solution to the iron oxide particle dispersion, the pH of the reaction mixture may be neutralized to a pH in the range of about 5.5 to 7.5, preferably from 6 to 7, typically 6.5 by the addition of further alkali.

In one embodiment of the process of the present invention, the simultaneous addition of alkali may be stopped or interrupted, respectively, before the addition of the titanyl salt solution is completed, and the residual titanyl salt solution may be then added to the reaction mixture without addition of further alkali, typically resulting in a drop of pH.

In an alternative embodiment, the precipitation of titanium dioxide can be performed by adding the alkali substantially after completion of the addition of the titanyl salt solution.

By suitably selecting the sequence of process steps, the process conditions of pH, choice of alkali and titanyl salt, temperature, reactant concentration, agitation and the like, the inventive process allows for the precipitation of specific titanium dioxide crystal phases or mixtures thereof. Starting from the same reactants (iron oxide, titanyl salt and a base) the inventive process allows to achieve different titanium dioxide crystal phases on the iron oxide particles. The titanium dioxide precipitation can be directed to a pure crystal phase, substantially pure anatase or substantially pure rutile (as detected by XRD analysis) and also to a mixed phase in which the two crystal phases are simultaneously present at different ratios on the iron oxide support.

The inventive processes are specifically advantageous, since they allow the coating of iron oxide particles with defined crystal phases of titanium dioxide at low temperature with the use of easily available and inexpensive reactants. In the process of the present invention, the resulting titanium dioxide-containing iron oxide particles are isolated from the reaction mixture by separating the solids, for example by filtration, washing and drying at low temperatures.

In order to produce defined crystal phases of titanium dioxide on the iron oxide particles, the inventive processes substantially do not require any high temperature steps such as annealing or calcination at elevated temperatures or autoclaving, as frequently used in the prior art. High temperature steps like calcination and annealing will include processing steps at temperatures above 150° C., which is undesirable and typically not necessary with the process of the present invention.

In the process of the present invention, substantially no process step involves temperatures above 150° C., and particularly drying of the titanium dioxide-coated particles may be performed at temperatures below 150° C., preferably below 130° C., e.g., at about 120° C., or even 110° C., while obtaining crystalline titanium dioxide coatings.

DETAILED DESCRIPTION OF THE INVENTION

Figure 1:
FIG. 1: Goethite crystals coated with $TiO_2$, as described in Example 1 (rutile): good coverage is achieved. Microanalysis of points a1) and a3) shows the presence of only titanium while point a2) shows both iron and titanium.

According to one embodiment of the present invention, a process is provided for the manufacture of iron oxide particles coated with crystalline titanium dioxide, wherein an aqueous solution of at least one titanyl salt is added to an iron oxide dispersion to form a reaction mixture, and titanium dioxide is precipitated on the iron oxide particles by addition of at least one alkali.

The iron oxide dispersion is typically a highly agitated dispersion of iron oxide particles in a suitable solvent or solvent mixture. Suitable solvents may comprise water, organic solvents such as, e.g. an alcohol or a hydrocarbon, and any mixtures thereof. Typically, the dispersion will comprise water as the sole solvent.

In order to uniformly distribute the iron oxide particles in the dispersion, stirring, preferably at high speeds, as known in the art is a suitable method of agitation to keep the particles uniformly dispersed.

The iron oxide particles are preferably iron oxide pigments such as yellow iron oxide, red iron oxide, black iron oxide, goethite, hematite and magnetite, as well as any mixtures thereof. The iron oxide particles may have a particle size ranging from 0.01 to 100 microns. The iron oxide particles may have a surface area ranging from about 5 to 200 $m^2/g$. Examples for suitable iron oxide particles are iron oxides commercially available from Rockwood, such as Ferroxide® yellow 48, Ferroxide® 49 (yellow iron oxides), Ferroxide® red 212 (red iron oxide), Ferroxide® black 77 (black iron oxide) or AC2544P (transparent yellow iron oxide).

The average particle size for the ferroxide yellows is 100× 500 nm, for both the red and the black iron oxide the particle size is 90-100 nm, while the transparent oxide has a particle size of 10×100 nm. The surface area of Ferroxide® yellow 48 is 19 m²/g, for Ferroxide yellow 49 the surface area is 17 m²/g, for Ferroxide® red 212 the surface area is 14 m²/g, for Ferroxide® black 77 the surface area is 15 m²/g, while for transparent iron oxides the surface area is 100-120 m²/g.

Generally, in the process of the present invention, the dispersion of iron oxide having a defined concentration is stirred at a defined speed and heated to a certain temperature. Subsequently, the solution of titanium salt may be added to the dispersion over a certain time simultaneously with a solution of an alkali or stepwise, or the alkali is added substantially after the titanyl salt addition is completed.

In one alternative embodiment, the alkali is added only after completion of the titanyl salt addition. After the addition of the titanium dioxide precursor, the pH is adjusted (if necessary, to a value between 5 and 8 with an alkali). The resulting reaction mixture may be filtered, washed and the solids may be dried in an oven.

Preferably, the iron oxide particle concentration in the dispersion is from about 1 to about 500 g/l, preferably from about 10 to about 250 g/l and, more preferably from about 50 to about 150 g/l.

The term "titanyl salt solution" as used herein generally refers to a solution of at least one titanyl salt and/or titanium salt in a suitable solvent. The titanyl salt solution preferably comprises an aqueous solution of at least one titanyl or titanium salt selected from titanyl sulfate, titanium chloride or other halogenated titanium salts, titanium nitrate, titanyl oxalate and any mixtures thereof, most preferably titanyl sulfate. Typically, the aqueous titanyl salt solution is acidic or may be acidified by addition of any suitable mineral acid, preferably sulfuric or nitric or hydrochloric acid.

Preferably, the overall concentration of titanyl salts in the aqueous solution is from about 10 to about 500 g/l, calculated as $TiO_2$, preferably from about 50 to about 300 g/l.

The alkali may be any alkaline or alkaline earth reacting material, such as a base in solid form or preferably as a liquid, and is preferably selected from aqueous solutions of sodium hydroxide, potassium hydroxide, sodium carbonate, magnesium hydroxide, ammonium hydroxide and any mixtures thereof, preferably an aqueous sodium hydroxide solution such as caustic soda. The concentration of the alkaline solution is typically not critical and may be selected in a suitable range, for example about 200 g/l. Preferably, the aqueous solution of an alkali is relatively concentrated.

The iron oxide particle dispersion is preferably heated to a temperature of at least 30° C., preferably at least 50° C., such as from about 60° C. to 100° C., more preferably between 80° C. to 100° C., especially preferred from about 85° C. to 100° C., preferably at least 90° C., and most preferably about 95° C. Preferably, the reaction mixture is also maintained at said temperatures during addition of the titanyl salt solution and/or alkali solution.

In an exemplary embodiment of the present invention, the precipitation of titanium dioxide is performed by a simultaneous or a sequential addition of at least one alkali to the reaction mixture. Simultaneous addition of the titanyl salt solution and the alkali may, for example, be performed by using a preformed mixture of the at least one titanyl salt and the alkali, typically comprising a solution of titanyl hydroxide. This preformed mixture may be added continuously or sequentially, i.e., stepwise in small portions, to the iron oxide particle dispersion. Alternatively, the titanyl salt solution and a separate alkali solution may be simultaneously added to the iron oxide particle dispersion.

By suitably controlling the rate of addition of the titanyl salt solution and/or the separate alkali solution, and/or the preformed mixture of titanyl salt and alkali, the pH of the reaction mixture during addition of the further reactants may be varied to a large extent. Applicants have observed that by suitably adjusting the pH in the reaction mixture, the nature of the titanium dioxide crystalline phase coated onto the iron oxide particles can be influenced in a range from 100% rutile to 100% anatase and any mixtures of both crystal forms in the desired ratio.

For example, the pH of the reaction mixture during addition of the titanyl salt and/or the alkali solution to the iron oxide particle dispersion may be maintained below 6.

In one exemplary embodiment of the process of the invention, the addition of alkali may be stopped before the addition of the titanyl salt solution to the iron oxide particle dispersion is completed, and the residual titanyl salt solution is then added to the reaction mixture, resulting in a drop of pH.

In all embodiments, the reaction mixture may be neutralized, if necessary, after completion of the titanyl salt solution addition to a pH in the range of about 5.5 to 7.5, preferably 6 to 7, and most preferred to about 6.5. This is typically done by the addition of further alkali as necessary.

In embodiments where the addition of alkali is stopped before the addition of the titanyl salt solution is completed, the residual titanyl salt solution may comprise from about 10 to about 40% by volume of the total amount of titanyl salt solution, preferably about 20% by volume. In such an embodiment, it is possible to provide a titanium dioxide coating comprising a mixture of anatase and rutile phase in a ratio of about 2:1 (determined by XRD).

Also, mixtures of anatase and rutile phase titanium dioxide coating on the iron oxide particles may be obtained by simultaneously adding the alkaline solution together with the titanyl sulfate and maintaining the pH at a relatively low value, for example at a pH of 3.0 or less. After completion of the titanyl salt addition, the reaction mixture can be neutralized with further alkali to a pH of 6.5. With this procedure, it is possible, for example, to produce a mixture of anatase and rutile in a ratio of 1:2 (determined by XRD).

In an alternative embodiment of the present invention, the process involves first adding the titanium salt solution completely to the iron oxide particle dispersion and thereafter ageing the reaction mixture for a certain period of time, preferably at least 15 minutes or more preferred at least 30 minutes. Preferably, the temperature of the reaction mixture is maintained during ageing above 60° C., preferably above 80° C. and, most preferably above 90° C., for example at 95° C. After ageing, the reaction mixture is neutralized to a pH of about 6.5 with an aqueous sodium hydroxide solution at a concentration of 200 g/l. Thereafter, the dispersion may be filtered, washed and dried at about 110° C. The titanium dioxide phase resulting from this procedure is typically substantially 100% rutile.

In processes where the titanyl sulfate is added simultaneously with the alkali, it is preferred to maintain the pH at about 3.5 to 3.7. After completion of the titanyl salt addition, the reaction mixture is neutralized to a pH of about 6.5, filtered, washed and dried. The resulting $TiO_2$ phase obtained from this procedure is typically substantially 100% anatase.

With the above processes, it is possible to individually adapt the process conditions with respect to the crystal phase of the titanium dioxide required in the coating of the iron oxide particles. By suitably selecting the reactants, the sequence of process steps, the temperature, pH and the process conditions, iron oxide particles coated with crystalline, preferably nanocrystalline rutile phase, anatase phase, or any mixtures of these crystal phases is possible. The resulting titanium dioxide-containing particles preferably comprise the TiO$_2$ in a rutile phase, anatase phase or a mixture of these crystal phases with a particle size in the range of 1 to 50 nm (determined by TEM).

For example, by suitably adjusting the acidity of the reaction mixture a strong influence on the crystal phase of the TiO$_2$ formed can be observed. In an acidic reaction mixture, for example when an acidic titanyl sulfate solution is added to the iron oxide particle dispersion without the addition of an alkali, the pH is typically below about pH 2, and neutralizing the reaction mixture with alkali after a certain period of ageing to the pH of about 6.5 results in the formation of 100% rutile phase in the iron oxide particle coating. On the other hand, by simultaneously or stepwise addition of alkali together with the titanyl sulfate and controlling the pH in a range from 3 to 4, preferably at pH 3.5, and subsequent neutralization of the reaction mixture after completion of the titanyl salt addition to a pH of 6.5, the resulting TiO$_2$ phase in the iron oxide particle coatings was observed to be 100% of anatase. Therefore, without wishing to be bound to any specific theory, on crystalline substrates like iron oxide particles precipitation of the TiO$_2$ at pH-values from about 3 to about 4 will favour the formation of anatase phase TiO$_2$, whereas a strongly acidic pH value during precipitation of titanium dioxide on the iron oxide particle dispersion will favour the formation of rutile phase TiO$_2$.

Figure 2:
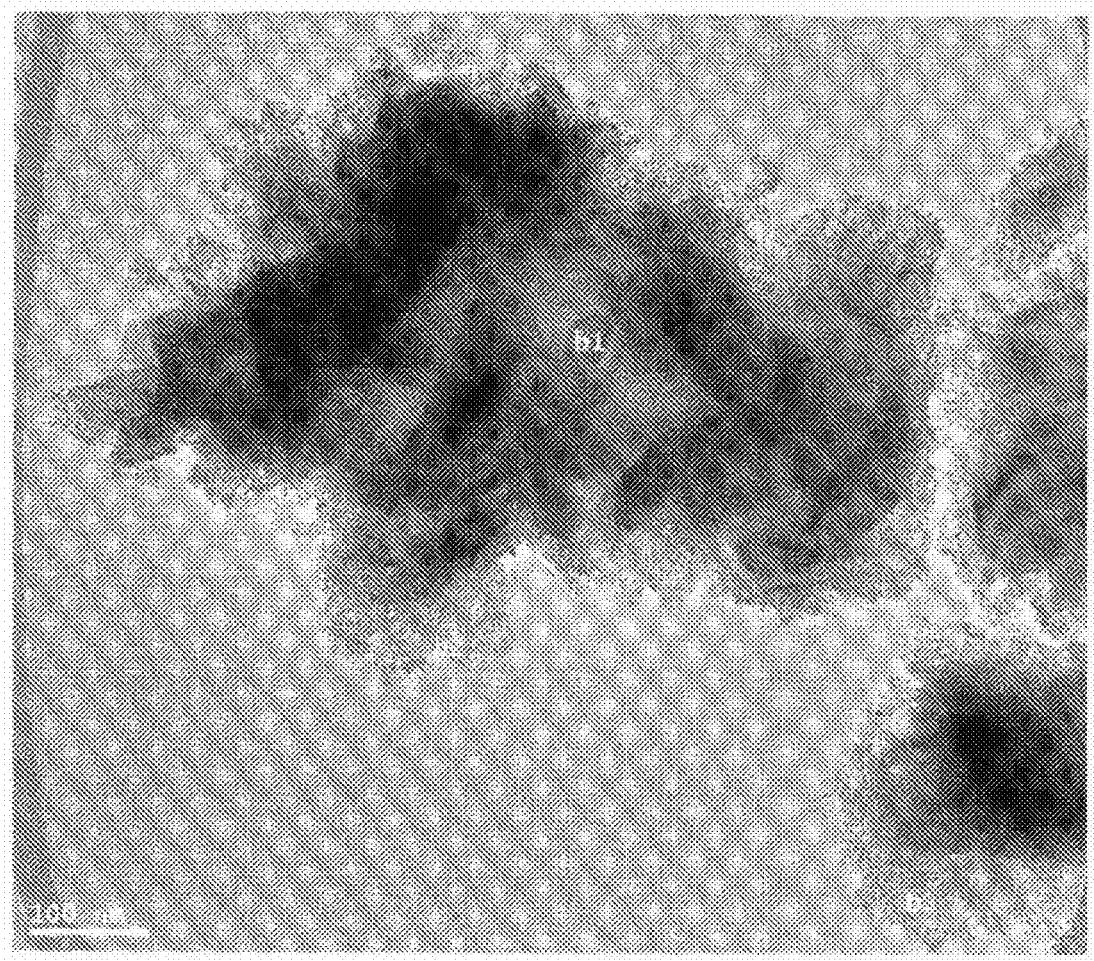
FIG. 2: Hematite crystals coated with $TiO_2$, as described in Example 3 (rutile): good coverage is achieved. Microanalysis of point b1) detected the presence of both iron and titanium.

The present invention involves controlled precipitation of crystalline titanium dioxide which forms in the presence of iron oxide particles, and based on the micrographic evidence in FIGS. 1, 2 and 10 appears to involve the formation of a coating of the crystalline titanium dioxide on the surface of the iron oxide particles. The presence of independent titanium dioxide particles however can be expected to be present to some degree and their presence does not limit the invention in any way.

As can be seen from the comparison example provided below, the use of non-crystalline supports like carbon or a support different from crystalline iron oxide would render similar acidic conditions, ageing and subsequent neutralization lead to anatase instead. Therefore, it is believed that in addition to the reaction conditions, the crystallinity of the iron oxide particles may also have an influence on the type of TiO$_2$ crystal phase formed under the specific processing conditions selected.

Also ionic strength of the solutions used and ionic strength in the final reaction mixture may also have an influence on the type and amount of the TiO$_2$ crystal phases formed.

Furthermore, it was observed that at constant temperature of the reaction mixture, in a one-step process, wherein the titanyl salt solution is simultaneously added to the iron oxide particle dispersion together with the alkali (from a preformed mixture or by simultaneous addition of titanyl salt solution and alkali solution), the formation of anatase phase TiO$_2$ was observed at pH-values of about 3.5 and above, and mixtures of anatase and rutile with increasing amounts of rutile was observed with lowering the pH value. At a pH of about 3, the ratio of rutile to anatase TiO$_2$ was at about 1 to 2, whereas at pH-values below 2 substantially pure rutile was observed. This is constant with the finding that in a two-step process, where the titanyl salt solution is added first, and neutralization with alkali is only done after a period of ageing, substantially 100% rutile was observed in any case.

In exemplary embodiments of the present invention, the amount of the reactants used is selected to achieve a final TiO$_2$ loading on the iron oxide particles of up to 50% by weight, preferably 5 to 40%, more preferably 10 to 30% and particularly preferred 15 to 25% by weight.

The iron oxide particles coated with crystalline titanium dioxide obtainable by the process as described herein typically have photocatalytic properties and may be used as a photocatalytic material. Specifically, the inventive precipitated titanium-iron oxide particles may be used in different applications such as self cleaning materials, anti-molding and bactericidal materials, environmental friendly and antipollution materials, or other catalytic applications.

The invention is now further illustrated by the following examples, which are not intended to limit the scope of the invention as defined in the appended claims.

Methods

The titanium dioxide phase composition was analysed with X-Ray diffraction techniques. The diffractometer used was a Philips X-Pert Pro with a Co X-ray source. The quantitative analysis was done using a Rietveld algorithm (software GSAS). Iron oxides surface areas were determined by single point BET on a Quantacrome Monosorb instrument (Nitrogen adsorption). Particle sizes values are the primary particles size and were determined by TEM analysis. TEM images were obtained using a Tecnai F20-ST with accelerating voltage of 200 kV, field emission gun (FEG). Point resolution of 2.4 Å, information limit of 1.0 Å, minimum spot size of 2 Å. Iron oxides used were from Rockwood Italia S.p.A., yellow iron oxides were Ferroxide® yellow 48, Ferroxide® 49, red iron oxide was Ferroxide® red 212, while transparent iron oxide was AC2544P.

Example 1

Figure 3:
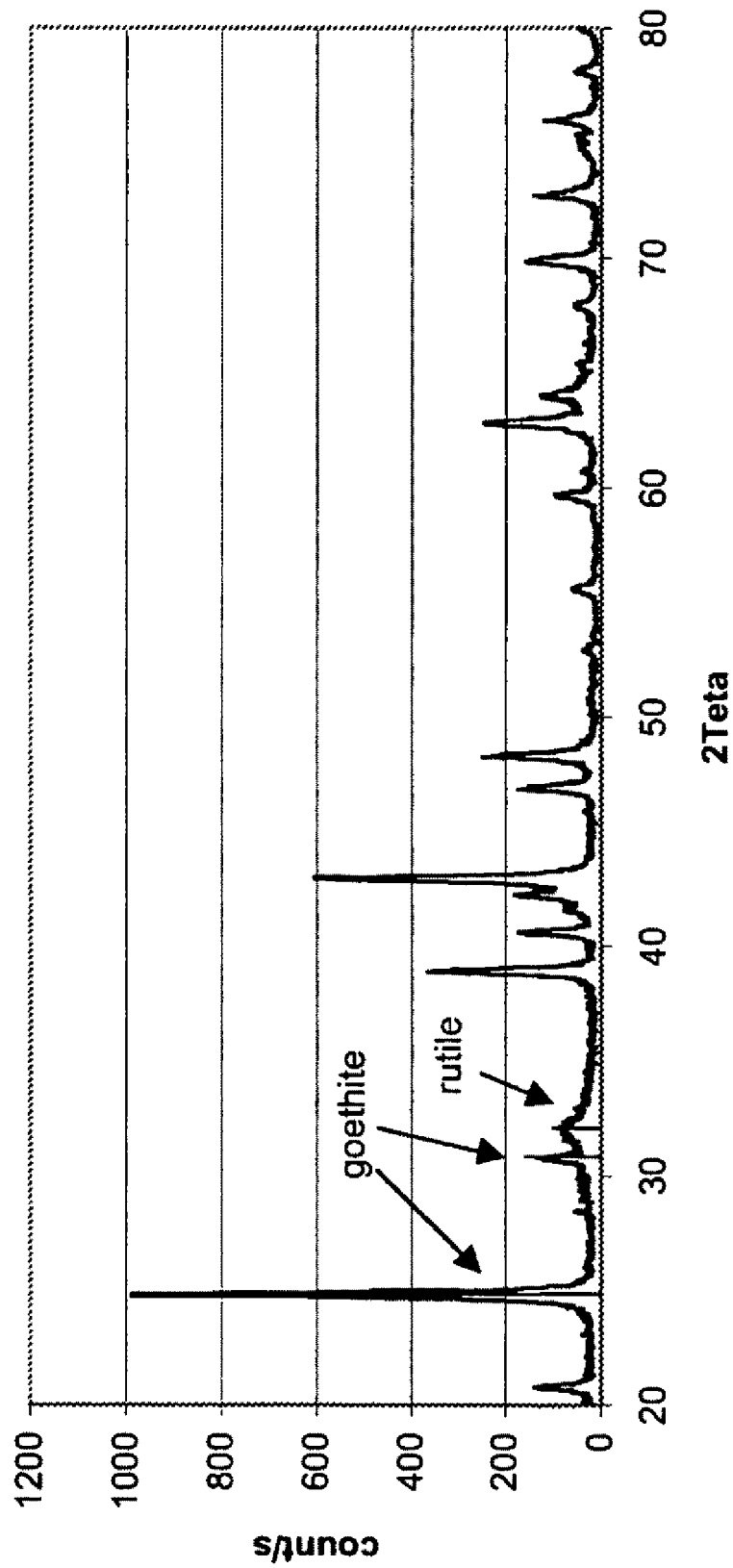
FIG. 3: XRD spectra of goethite coated with $TiO_2$ referring to Example 1: the broad peak present in the 31.8° region indicates that titanium dioxide is present in the rutile form and the breadth of the peak indicates the presence of very small crystallites of rutile titanium dioxide.

A 100 g/l dispersion of yellow iron oxide was heated to 95° C. and kept under high stirring. A 112 g/l solution of titanyl sulfate (calculated as TiO$_2$) was added within one hour. TiO$_2$ loading on iron oxide was 30% by weight. At the end of addition, the solution was aged for 30 min and then neutralized in 20 min to pH=6.5 with aqueous caustic soda solution at a concentration of 200 g/l. The dispersion was filtered, washed and dried at 110° C. The resulting TiO$_2$ phase was 100% rutile (TEM FIG. 1: Microanalysis of points a1) and a3) shows the presence of only Titanium while point a2) shows both iron and titanium). (XRD FIG. 3: the broad peak present in the 31.8° region indicates that titanium dioxide is present in the rutile form and the breadth of the peak indicates the presence of very small crystallites of rutile titanium dioxide).

Example 2

Figure 4:
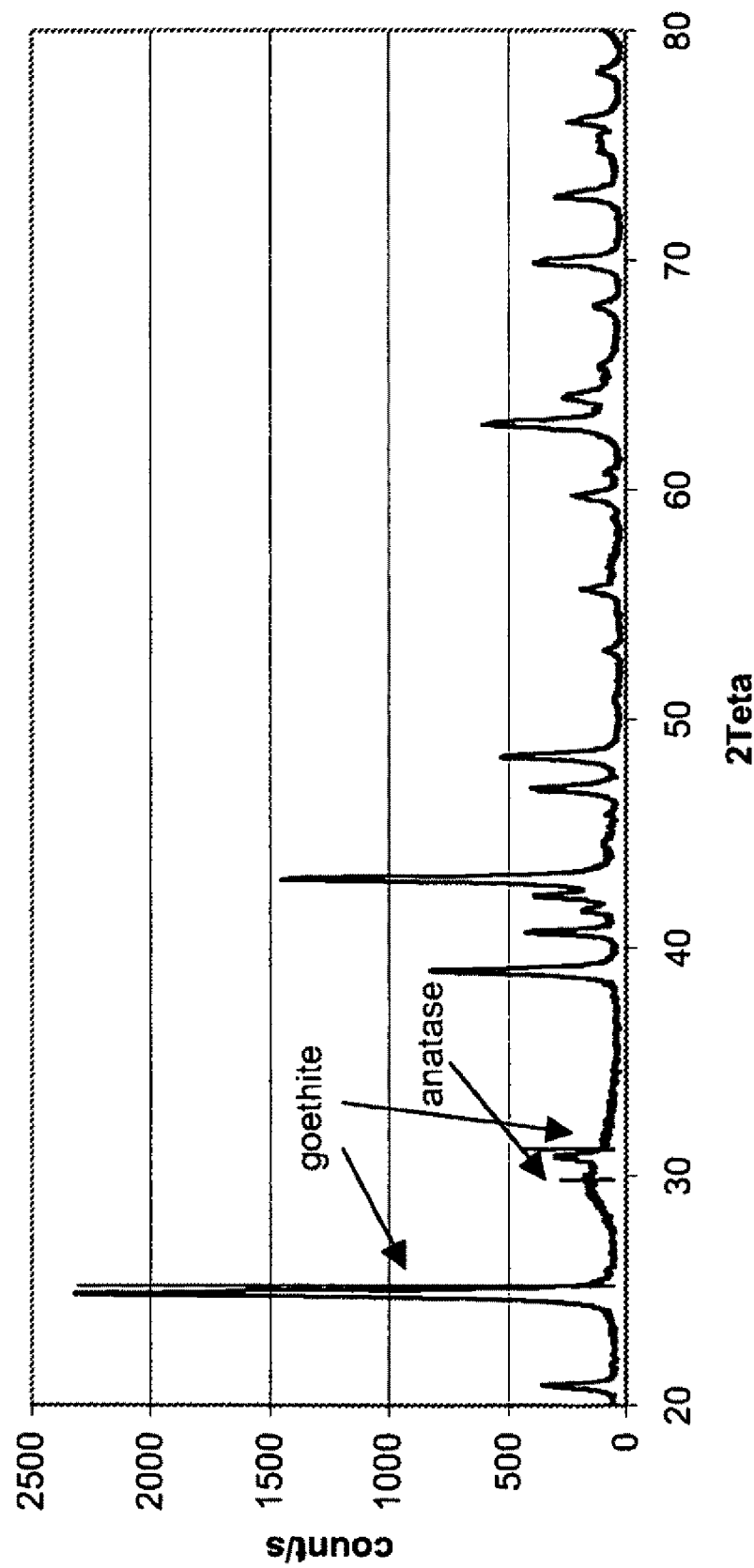
FIG. 4: XRD spectra of goethite coated with $TiO_2$ referring to Example 2: the broad peak present in the 29° region indicates that titanium dioxide is present in the anatase form and the breadth of the peak indicates the presence of very small crystallites of anatase titanium dioxide. The anatase peak is somewhat distorted due to overlap with the goethite peak at 30.6°.

A 100 µl dispersion of yellow iron oxide was heated to 95° C. and kept under high stirring. A 112 g/l solution of titanyl sulfate (calculated as TiO$_2$ was added in one hour. TiO$_2$ loading on iron oxide was 30% by weight. Simultaneously, an aqueous caustic soda solution at a concentration of 200 g/l was added in such a way to maintain the pH at 3.5. At the end of titanyl salt addition, the solution was neutralized to pH=6.5 with NaOH. The dispersion was filtered, washed and dried at 110° C. The resulting TiO$_2$ phase was 100% anatase. (XRD FIG. 4: the broad peak present in the 29° region indicates that titanium dioxide is present in the anatase form and the breadth of the peak indicates the presence of very small crystallites of anatase titanium dioxide. The anatase peak is somewhat distorted due to overlap with the goethite peak at 30.6°).

Comparison Example 1

An experiment under the same conditions as in Example 1 was done on a non-crystalline support. A 100 g/l dispersion of amorphous carbon (Cabosil M5) was heated to 95° C. and kept under high stirring. A 112 g/l solution of titanyl sulfate (calculated as $TiO_2$) was added within one hour. Final $TiO_2$ loading on carbon was 30% by weight. At the end of addition, the solution was aged for 30 min and then neutralized in 20 minutes to pH 6.5 with aqueous caustic soda solution at a concentration of 200 g/l. The dispersion was filtered, washed and dried at 110° C. The resulting $TiO_2$ phase was 100% anatase.

Comparison Example 2

An experiment under the same conditions as in Examples 1 and 3 was done on a crystalline support different from iron oxide. A 100 g/l dispersion of Alumina ($Al_2O_3$ 90 Merk) was heated to 95° C. and kept under high stirring. A 112 g/l solution of titanyl sulfate (calculated as $TiO_2$) was added within one hour. $TiO_2$ loading on iron oxide was 30% in weight. At the end of addition, the solution was aged for 30 min and then neutralized in 20 min to pH=6.5 with aqueous caustic soda solution at a concentration of 200 g/l. The dispersion was filtered, washed and dried at 110° C. The resulting $TiO_2$ phase was 100% anatase.

Example 3

A 100 g/l dispersion of red iron oxide was heated to 95° C. and kept under high stirring. A 112 g/l solution of titanyl sulfate (calculated as $TiO_2$) was added within one hour. $TiO_2$ loading on iron oxide was 30% in weight. At the end of addition, the solution was aged for 30 min and then neutralized in 20 min to pH=6.5 with aqueous caustic soda solution at a concentration of 200 g/l. The dispersion was filtered, washed and dried at 110° C. The resulting $TiO_2$ phase was 100% rutile. Microanalysis of point b1) detected the presence of both iron and titanium.

(TEM FIG. 2)

Example 4

Figure 6:
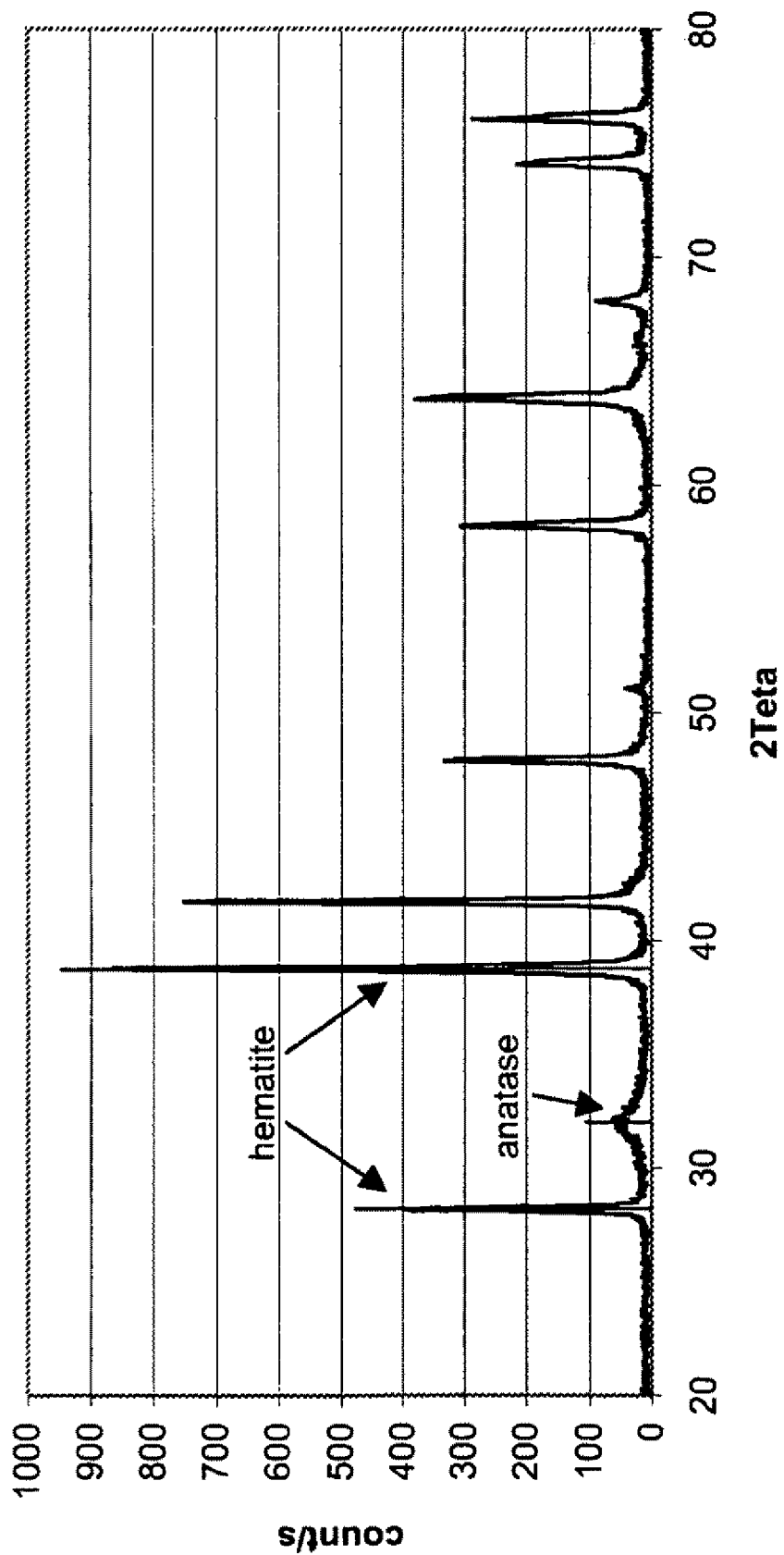
FIG. 6: XRD spectra of hematite coated with $TiO_2$ referring to Example 4: the only $TiO_2$ phase present is anatase. In this example a characteristic anatase peak is observed as there is no overlap with hematite peaks.

A 100 g/l dispersion of red iron oxide was heated to 95° C. and kept under high stirring. A 112 g/l solution of titanyl sulfate (calculated as $TiO_2$) was added within one hour. $TiO_2$ loading on iron oxide was 30% in weight. Simultaneously, an aqueous caustic soda solution at a concentration of 200 g/l was added in such a way to maintain the pH at 3.7. At the end of titanyl salt addition the solution was neutralized to pH=6.5 with NaOH. The dispersion was filtered, washed and dried at 110° C. The resulting $TiO_2$ phase was 100% anatase (FIG. 6). The only $TiO_2$ phase present is anatase. In this example a characteristic anatase peak is observed as there is no overlap with hematite peaks.

Example 5

A 100 g/l dispersion of black iron oxide was heated to 95° C. and kept under high stirring. A 112 g/l solution of titanyl sulfate (calculated as $TiO_2$) was added within one hour. $TiO_2$ loading on iron oxide was 30% in weight. Simultaneously, an aqueous caustic soda solution at a concentration of 200 g/l was added in such a way to maintain the pH at 3.5. At the end of titanyl salt addition the solution was neutralized to pH=6.5 with NaOH. The dispersion was filtered, washed and dried at 110° C. The resulting $TiO_2$ phase was a mixture of anatase and rutile.

Example 6

A 100 g/l dispersion of transparent yellow iron oxide was heated to 95° C. and kept under high stirring. A 112 g/l solution of titanyl sulfate (calculated as $TiO_2$) was added within one hour. $TiO_2$ loading on iron oxide was 50% in weight. Simultaneously, an aqueous caustic soda solution at a concentration of 200 g/l was added in such a way to maintain the pH at 4.2. At the end of titanyl salt addition the solution was neutralized to pH=6.5 with NaOH. The dispersion was filtered, washed and dried at 110° C. The resulting $TiO_2$ phase was anatase.

Example 7a and 7b

A 100 g/l dispersion of yellow iron oxide was heated to 95° C. and kept under high stirring. A 112 g/l solution of titanyl sulfate (calculated as $TiO_2$) was added in one hour. The $TiO_2$ loading on iron oxide was varied as reported in Table 2. Simultaneously, an aqueous caustic soda solution at a concentration of 200 g/l was added in such a way to maintain the pH at 3.5. At the end of titanyl salt addition, the solution was neutralized to pH=6.5 with NaOH. The dispersion was filtered, washed and dried at 110° C. The resulting $TiO_2$ phase is reported in Table 2.

TABLE 2

| Experiment | $TiO_2$ Loading on FeOx | $TiO_2$ crystal phase | $TiO_2$ Layer depth nm |
| --- | --- | --- | --- |
| 7 a) | 20 | anatase | 15 |
| 7 b) | 40 | anatase | / |

Example 8

A 100 g/l dispersion of yellow iron oxide was heated to 95° C. and kept under high stirring. A 112 g/l solution of titanyl sulfate (calculated as $TiO_2$) was added within one hour. $TiO_2$ loading on iron oxide is 30% in weight. Simultaneously, an aqueous caustic soda solution at a concentration of 200 g/l was added in such a way to maintain the pH at 3.5 for 80% of titanyl addition. Then the alkali flow was stopped for the remaining 20% of titanyl salt solution, resulting in a drop of pH. At the end of titanyl salt addition, the solution was neutralized to pH=6.5 with NaOH. The dispersion was filtered, washed and dried at 110° C. The resulting $TiO_2$ phase was between 60 and 65% anatase and between 35-40% rutile.

Example 9

Figure 5:
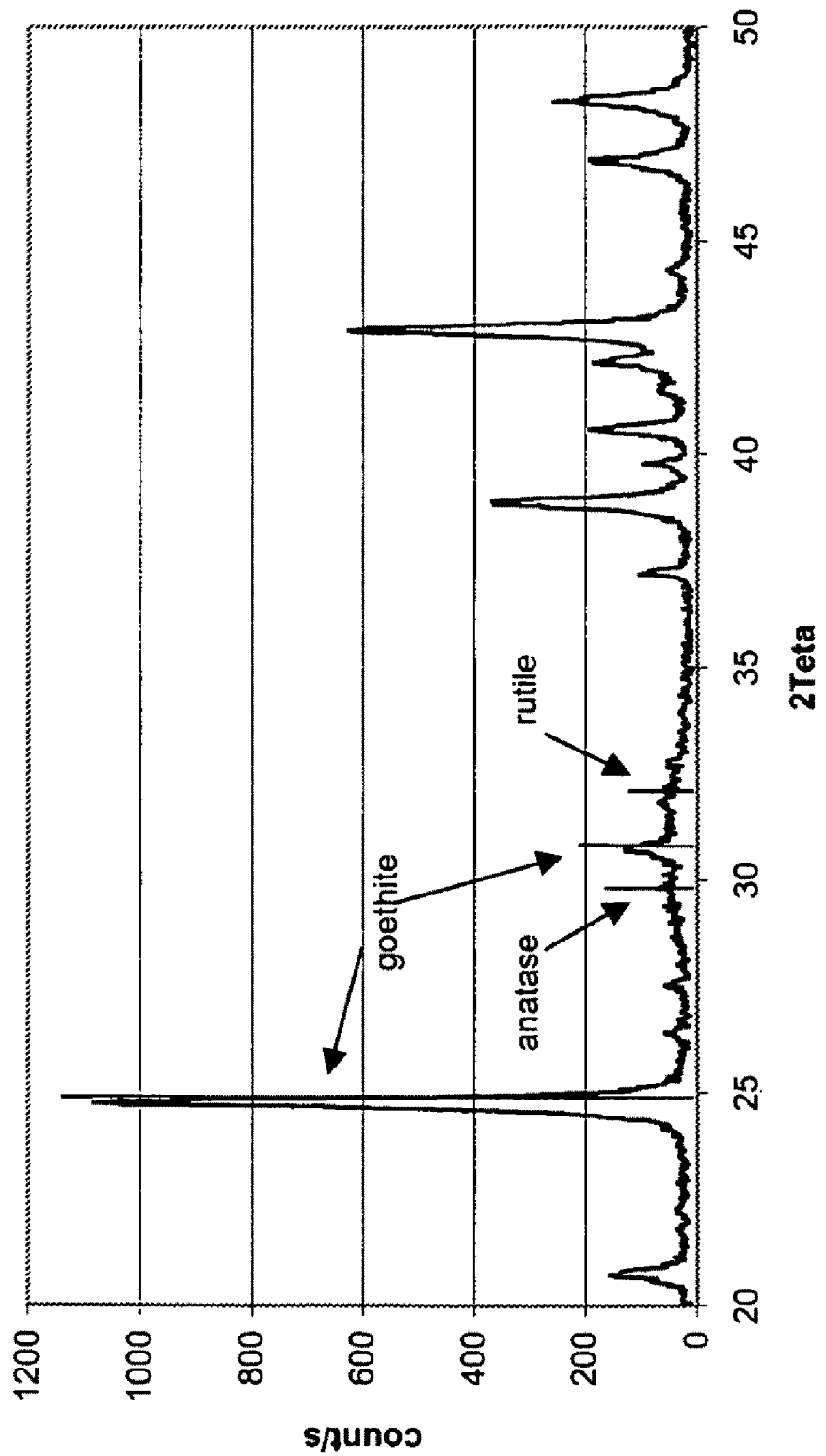
FIG. 5: XRD spectra of goethite coated with $TiO_2$ referring to Example 9: both $TiO_2$ phases are visible and the relative percentage in weight is 34% anatase and 66% rutile. Peaks of goethite anatase and rutile are present, both $TiO_2$ peaks are broad due to the very small size of the crystallite.

A 10 g/l dispersion of yellow iron oxide was heated to 95° C. and kept under high stirring. A 112 g/l solution of titanyl sulfate (calculated as $TiO_2$) is added within one hour. $TiO_2$ loading on iron oxide was 30% in weight. Simultaneously, an aqueous caustic soda solution at a concentration of 200 g/l was added in such a way to maintain the pH at 3.0. At the end of titanyl salt addition, the solution was neutralized to pH=6.5 with NaOH. The dispersion was filtered, washed and dried at 110° C. FIG. 5 shows the XRD spectra: both $TiO_2$ phases are visible and the relative percentage in weight is 34% anatase and 66% rutile. Peaks of goethite anatase and rutile are present, both $TiO_2$ peaks are broad due to the very small size of the crystallite.

The invention claimed is:

1. A process for the manufacture of iron oxide particles containing precipitated crystalline titanium dioxide, comprising the steps of:
   a. adding an aqueous solution of at least one titanyl salt to an iron oxide particle dispersion to form a reaction mixture, wherein at least one of the iron oxide particle dispersion and the reaction mixture is heated to a temperature of at least 50° C. and the pH of the reaction mixture is maintained below 6;
   b. precipitating titanium dioxide on said iron oxide particles by adding an alkali, wherein the titanium dioxide is precipitated at least partially in a crystalline form; and
   c. isolating the resulting iron oxide particles containing precipitated crystalline titanium dioxide from the reaction mixture.

2. The process of claim 1, wherein the reaction mixture is heated to a temperature of from about 60 to 100° C.

3. The process of claim 1, wherein the precipitation of titanium dioxide is performed by simultaneous or sequential addition of at least one alkali to the reaction mixture.

4. The process of claim 1, in which the titanyl salt solution is added to the iron oxide particle dispersion simultaneously with the alkali.

5. The process of claim 4, wherein a preformed mixture of the at least one titanyl salt and the alkali is added to the iron oxide particle dispersion.

6. The process of claim 4, wherein the titanyl salt solution and a separate alkali solution are simultaneously added to the iron oxide particle dispersion.

7. The process of claim 1, wherein the reaction mixture during addition of the titanyl salt solution and the alkali to the iron oxide particle dispersion is maintained at a pH-value of from about 1 to about 5.

8. The process of claim 1, wherein the reaction mixture is neutralized to a pH in the range of about 5.5 to 7.5, after completion of steps a) and b), by addition of further alkali.

9. The process of claim 1, wherein the addition of alkali is stopped before the addition of the titanyl salt solution is completed, and the residual titanyl salt solution is then added to the reaction mixture, resulting in a drop of pH.

10. The process of claim 9, further including neutralizing the reaction mixture to a pH in the range of about 5.5 to 7.5, after completion of the addition of residual titanyl salt solution, by addition of further alkali.

11. The process of claim 9, wherein the residual titanyl salt solution comprises from about 10 to about 40% by volume of the total amount of titanyl salt solution.

12. The process of claim 1, wherein the precipitation of titanium dioxide is performed by adding the alkali after completion of the addition of the titanyl salt solution.

13. The process of claim 12, wherein the reaction mixture is neutralized to a pH in the range of about 5.5 to 7.5, after completion of steps a) and b), by addition of further alkali.

14. The process of claim 12, wherein the reaction mixture is aged for a sufficient time, before the alkali is added, to precipitate the $TiO_2$ at least partially in rutile crystalline form.

15. The process of claim 1, wherein the iron oxide particles are selected from iron oxide pigments.

16. The process of claim 15, wherein the iron oxide pigments are selected from yellow iron oxide, red iron oxide, black iron oxide and mixtures thereof.

17. The process of claim 15, wherein the iron oxide pigments have a particle size ranging from 0.01 to 10 micron.

18. The process of claim 1, wherein the iron oxide particle dispersion includes the iron oxide particles in a suitable fluid, and the dispersion is highly agitated.

19. The process of claim 1, wherein the at least one titanyl salt is selected from titanyl sulfate, titanium chloride, titanium nitrate, titanyl oxalate, titanyl hydroxide, and any mixtures thereof.

20. The process of claim 1, wherein the iron oxide particle concentration in the dispersion is from about 1 to about 500 g/l.

21. The process of claim 1, wherein the titanyl salt concentration in the aqueous titanyl salt solution is from about 10 to about 500 g/l, calculated as $TiO_2$.

22. The process of claim 1, wherein the amount of the reactants used is selected to achieve a final $TiO_2$ loading on the iron oxide particles of up to 50% by weight, referring to the total dry weight of the loaded particles.

23. The process of claim 1, wherein the at least one alkali is selected from aqueous solutions of sodium hydroxide, potassium hydroxide, sodium carbonate, ammonium hydroxide, and any mixtures thereof.

24. The process of claim 1, wherein the step of isolating the iron oxide particles containing precipitated crystalline titanium dioxide comprises separating and drying the solids from the reaction mixture.

25. The process of claim 24, wherein the iron oxide particles containing precipitated crystalline titanium dioxide are dried at a temperature below 150° C.

26. The process of claim 1, not comprising any calcination or annealing step, and/or not comprising any process step involving a temperature above 150° C.

27. The process of claim 1, wherein no post-treatment steps comprising surface modifiers are performed.

28. The process of claim 1, wherein the titanium dioxide precipitated in crystalline form comprises substantially 100% anatase.

29. The process of claim 1, wherein the titanium dioxide precipitated in crystalline form comprises a mixture of anatase and rutile.

30. The process of claim 1, wherein the titanium dioxide precipitated in crystalline form comprises substantially 100% rutile.

31. The process of claim 1, wherein a $TiO_2$ precursor is precipitated in sequential steps and the resulting $TiO_2$ phase on the iron oxide particles is substantially 100% rutile.

32. Iron oxide particles containing precipitated crystalline titanium dioxide, obtainable by the process of claim 1.

33. The particle of claim 32, comprising a nanocrystalline titanium dioxide coating.

34. The particle of claim 32, wherein the titanium dioxide comprises rutile phase, anatase phase or a mixture of these crystal phases.

35. A process comprising contacting the iron oxide particles containing precipitated crystalline titanium oxide of claim 32 with at least one reactant under conditions effective to photocatalyze a reaction of the at least one reactant to form at least one product.

36. A process comprising incorporating the iron oxide particles containing precipitated crystalline titanium oxide of claim 32 into a building material in an amount sufficient to color the building material.

37. The process of claim 36 wherein the building material comprises concrete or cement.

38. The process of claim 1, wherein the aqueous solution of at least one titanyl salt comprises an aqueous solution of titanium chloride.

* * * * *

UNITED STATES PATENT AND TRADEMARK OFFICE
CERTIFICATE OF CORRECTION

| | | |
|---|---|---|
| PATENT NO. | : 7,833,935 B2 | Page 1 of 1 |
| APPLICATION NO. | : 11/913743 | |
| DATED | : November 16, 2010 | |
| INVENTOR(S) | : Claudia Menini et al. | |

It is certified that error appears in the above-identified patent and that said Letters Patent is hereby corrected as shown below:

Title Page 1, Column 1:

(22) PCT Filed: change: "Aug. 11, 2006" to --November 8, 2006--

Signed and Sealed this
Fifth Day of April, 2011

David J. Kappos
*Director of the United States Patent and Trademark Office*